(12) United States Patent
Comb (10) Patent No.: US 6,547,995 B1
(45) Date of Patent: Apr. 15, 2003

(54) MELT FLOW COMPENSATION IN AN EXTRUSION APPARATUS

(75) Inventor: James W. Comb, Hamel, MN (US)

(73) Assignee: Stratasys, Inc., Eden Prairie, MN (US)

(*) Notice: Subject to any disclaimer, the term of this patent is extended or adjusted under 35 U.S.C. 154(b) by 25 days.

(21) Appl. No.: 09/960,133

(22) Filed: Sep. 21, 2001

(51) Int. Cl.⁷ .............................................. B29C 47/00
(52) U.S. Cl. ..................... 264/40.1; 264/40.7; 264/255; 264/308; 425/145; 425/147
(58) Field of Search .............................. 264/40.1, 40.7, 264/177.1, 255, 308; 425/145, 147, 166, 162; 700/119

(56) References Cited

U.S. PATENT DOCUMENTS

| | | | |
|---|---|---|---|
| 5,065,695 A | | 11/1991 | Baron et al. ................ 118/688 |
| 5,121,329 A | | 6/1992 | Crump ........................ 364/468 |
| 5,340,433 A | * | 8/1994 | Crump ........................ 156/578 |
| 5,402,351 A | * | 3/1995 | Batchelder et al. ......... 700/119 |
| 6,054,077 A | | 4/2000 | Comb et al. ................ 264/40.7 |
| 6,065,957 A | | 6/2000 | Zinniel et al. ................. 226/8 |
| 6,238,613 B1 | * | 5/2001 | Batchelder et al. ......... 264/404 |

\* cited by examiner

Primary Examiner—Mark Eashoo
(74) Attorney, Agent, or Firm—Kinney & Lange, P.A.

(57) ABSTRACT

Disclosed are a method and apparatus for matching the extrusion rate of a liquifier which extrudes a flow of material to a predetermined target output rate. The present invention adjusts the volumetric rate of material going in to the liquifier to account for a predicted melt flow component of material being extruded from the liquifier. Compensating for the predicted melt flow results in reduced error in an extrusion profile produced by material deposited along a toolpath followed by the liquifier.

13 Claims, 4 Drawing Sheets

MELT FLOW COMPENSATION IN AN EXTRUSION APPARATUS

CROSS-REFERENCE TO RELATED APPLICATION(S)

None.

BACKGROUND OF THE INVENTION

This invention relates to the fabrication of three-dimensional objects using extrusion-based layered manufacturing techniques. More particularly, the invention relates to supplying solid modeling material to a liquifier carried by an extrusion head, and extruding the material in a flowable state in a predetermined pattern in three dimensions with respect to a base.

Three-dimensional models are used for functions including aesthetic judgments, proofing a mathematical model, forming hard tooling, studying interference and space allocation, and testing functionality. Extrusion-based layered manufacturing machines build up three-dimensional models by extruding solidifiable modeling material from an extrusion head in a predetermined pattern, based upon design data provided from a computer aided design (CAD) system. Examples of extrusion-based apparatus and methods for making three-dimensional objects are described in Crump U.S. Pat. No. 5,121,329, Crump U.S. Pat. No. 5,340,433, Danforth et al. U.S. Pat. No. 5,738,817, Batchelder et al. U.S. Pat. No. 5,764,521 and Dahlin et al. U.S. Pat. No. 6,022,207, all of which are assigned to Stratasys, Inc., the assignee of the present invention.

A feedstock of either a liquid or solid modeling material is provided to the extrusion head. Where the feedstock of modeling material is in solid form, the extrusion head brings the feedstock to a flowable temperature for deposition. One technique provides the modeling material to the extrusion head in the form of a filament strand.

In the Stratasys FDM® modeling machines of the current art which employ a filament feed, modeling material is loaded into the machine as a flexible filament wound on a supply reel, such as disclosed in U.S. Pat. No. 5,121,329. A solidifiable material which adheres to the previous layer with an adequate bond upon solidification and which can be supplied as a flexible filament is used as the modeling material. Motor-driven feed rollers advance the strand of the filament into a liquifier carried by an extrusion head. Inside the liquifier, the filament is heated to a flowable temperature. Flowable modeling material is forced out of a nozzle on the far end of the liquifier, and deposited from the liquifier onto a base. The motor-driven feed rollers pushing filament into the liquifier create a "liquifier pump", wherein the filament itself serves as the piston. As the feed rollers advance filament into the liquifier, the force of the incoming filament strand extrudes the flowable material out from the nozzle. The flow rate of the material extruded from the nozzle is a function of the rate at which the filament is advanced to the head. The flow rate is commanded by controlling the speed of advancement of filament into the liquifier. A controller controls movement of the extrusion head in a horizontal x, y plane, controls movement of the base in a vertical z-direction, and controls the rate at which the feed rollers advance filament. By controlling these processing variables in synchrony, the modeling material is deposited in "beads" layer-by-layer along tool paths defined from the CAD model. The material being extruded fuses to previously deposited material and solidifies to form a three-dimensional object resembling the CAD model.

The extruded material delivered by the liquifier pump has a bead of a cross-sectional area that should ideally be controlled to create an accurate model. Usually, a constant bead width is desired. The bead width is related to the flow rate of material out of the pump as well as the extrusion head velocity. The bead width is also affected by the clearance between the extruding nozzle tip and a previously extruded layer (or the base). If the head velocity were to change while the flow rate were to stay constant, the bead width would vary as well.

One type of rapid prototyping system of the prior art drives the motion of the extrusion head at a constant velocity along a tool path comprising a poly-line. A poly-line is a continuous curve of straight-line segments defined by a list of X-Y coordinate pairs at each vertex. The head velocity is preselected so as to accomplish the general goal of moving the extrusion head quickly along the poly-line while minimizing the displacement from the tool path. As a result, the head velocity must be set to be slow enough that the deviation will not exceed the maximum allowable following error for the largest deflection along that poly-line. Using a constant head velocity along a tool path, bead width remains fairly constant but errors arise at start points and end points of the tool path, for instance, at the location of a "seam" (i.e., the start and end point of a closed-loop tool path).

Another type of prototyping system of the prior art varies the extrusion head speed to increase the throughput of the modeling machine. The extrusion head speeds up along straight-aways in the tool path, and slows down where there are deflection angles or vertices. U.S. Pat. No. 6,054,077 describes one such technique for varying the extrusion head speed, using X-Y trajectory profiling that follows the exponential step response of the liquifier pump. The velocity profile of the extrusion head looks like a "shark tooth", while the pump profile follows a step function.

It has been observed that the variable velocity systems of the prior art introduce greater bead width error, and also have seam errors. It would be desirable to reduce errors in bead width and seam quality so as to achieve a desired extrusion profile, while allowing the higher throughput of a variable rate system.

BRIEF SUMMARY OF THE INVENTION

The present invention is a liquifier pump control method and apparatus which reduces bead width errors and seams errors observed in the prior art by accounting for thermal expansion of the modeling material in the liquifier. The melting of modeling material is accompanied by its expansion. The present invention recognizes that the melt expansion produces unanticipated extruded flow rates from the liquifier during transient conditions. The present invention predicts a melt flow component of the extruded flow rate produced by the thermal expansion of the modeling material, and compensates for the predicted melt flow in a commanded flow rate.

BRIEF DESCRIPTION OF THE DRAWINGS

FIG. 5b is a graphical representation of the amount of flow produced by the liquifier pump of FIG. 5a.

FIG. 6b is a graphical representation of the amount of flow produced by the liquifier pump of FIG. 6a.

FIG. 7b is a graphical representation of the amount of flow produced by the liquifier pump of FIG. 7a.

DETAILED DESCRIPTION

The method and apparatus of the present invention may be employed with respect to an extrusion system which extrudes material that exhibits thermal expansion from a liquifier pump. Particularly applicable are various types of modeling or prototyping systems which utilize an extrusion head to deposit "roads" of material heated to be flowable, and which material shrinks and solidifies upon a drop in temperature to form a solid model. A preferred material deposition and build-up process is of the type disclosed in U.S. Pat. No. 5,121,329.

Figure 1:
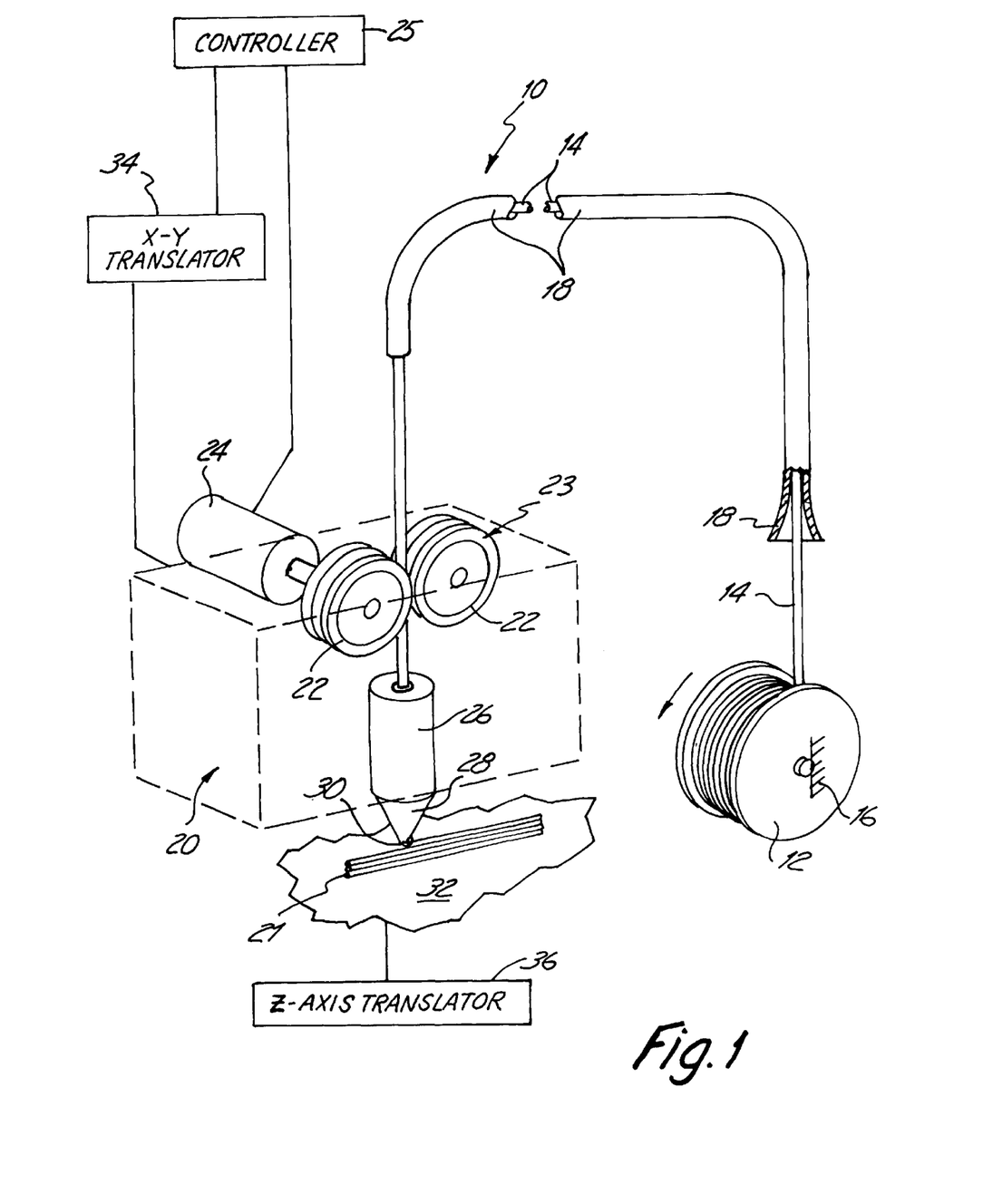
FIG. 1 is a perspective, diagrammatic view of a liquifier pump extrusion apparatus in a three-dimensional modeling machine.

FIG. 1 shows an exemplary three-dimensional modeling machine 10 having an extrusion head 20 which deposits modeling material under the control of a controller 25. The extrusion head 20 carries a liquifier 26 which receives a feed stock of modeling material and heats it to a temperature desired for extrusion. Molten modeling material is deposited from a tip 30 of the liquifier 26 in beads 21 onto a planar base 32 (shown in part). In the preferred embodiment shown, the modeling material feedstock is a flexible filament 14. Typically, the filament has a small diameter, such as on the order of 0.070 inches. A spool 12 carrying a coil of filament 14 is mounted on a spindle 16. A strand of the filament 14 is fed through a guide tube 18, which routes the strand of filament 14 to the extrusion head 20. A material advance mechanism 23 comprised of a pair of feed rollers 22 driven by a motor 24 advances the filament 14 into the liquifier 26 at a controlled rate. Together, the liquifier 26, the filament 14 and the material advance mechanism 23 form a liquifier pump.

The liquifier 26 is pressurized by the "pumping" of the strand of filament 14 into the liquifier 26 by feed rollers 22. The strand of filament 14 acts as a piston. The pressurization impels the molten modeling material out of the tip 30. The volumetric flow rate of liquid material flowing from the pump ($Q_{oL}$) is controlled by adjusting the speed of rotation of the feed rollers 22. As shown, one of feed rollers 22 is a drive roller, driven by the motor 24 under the control of the controller 25. The other roller 22 is an idler roller. The controller 25 controls pump flow rate $Q_{oL}$ by providing control signals to the motor 24 which drives the rollers 22.

The extrusion head 20 is driven along tool paths in a horizontal x,y plane by an x-y translator 34, which receives drive signals from the controller 25 in accordance with design data derived from a CAD model. As the extrusion head 20 is translated in the x-y plane, molten modeling material is controllably dispensed from the tip 30 layer-by-layer onto the base 32. After each layer is dispensed, the base 32 is lowered a predetermined increment along a vertical z-axis by a z-axis translator 36, which also receives drive signals from the controller 25. The dispensed material fuses and solidifies to form a three-dimensional object resembling the CAD model. Modeling material used to build a support structure may be dispensed in a like fashion in coordination with the dispensing of modeling material used to build up the object, to support portions of the object as it is under construction.

As will be understood by those in the art, many variations of the modeling machine and process are possible. For example, any relative movement in three-dimensions between the extrusion head 20 and the base 32 may be used to built up the object. The feedstock of modeling material, the liquifier and the material advance mechanism may take many various forms.

Materials that may be used as the modeling material include thermoplastics, metals, ceramics, and waxes. It is also known that modeling may be water. With the exception of water, most modeling materials expand when they melt. Prior art flow control methods do not account for this behavior, resulting in the inability to maintain a constant bead width in seams or between start and end points.

In the prior art, control of the liquifier has been based on a pressure model. This model takes into account volume changes of the modeling material due to changes in pressure and pressure drop across the dispensing tip, but does not account for volume changes due to changes in temperature. Applying the pressure model, liquifier flow control is divided into phases, such as those described in U.S. Pat. No. 6,054,077. The phases include a pre-pump phase (in which the liquifier pump is commanded on but due to time delay is not yet extruding material) and a suck-back phase (in which the liquifier pump is commanded off but continues to extrude material). It should be understood that the present invention is most effectively implemented as a compliment to prior art techniques for flow control.

Figure 2A:
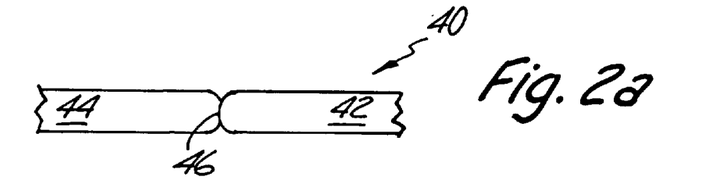
FIG. 2a illustrates an extrusion profile joined together by a good seam.
Figure 2B:
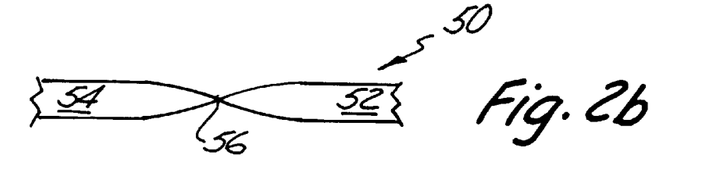
FIG. 2b illustrates an extrusion profile joined together by a light or seam.
Figure 2C:
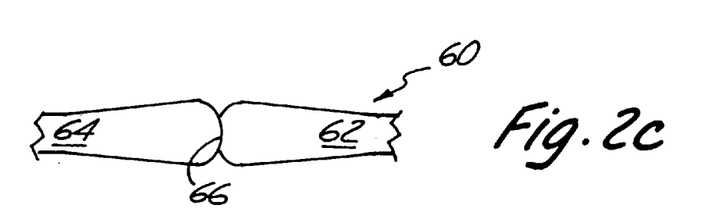
FIG. 2c illustrates an extrusion profile joined together by a heavy seam.

FIG. 2a illustrates a desired extrusion profile 40 along a closed tool path (i.e. a tool path having the same start position and stop position). The extrusion profile 40 includes a start tool path portion 42 and a stop tool path portion 44 joined together by a good seam 46. In extrusion profile 40, the bead width remains constant, resulting in a smooth transition between start and stop tool path portions 42 and 44. FIGS. 2b and 2c illustrate errors in extrusion profiles, which have been observed along a closed tool path with the prior art pressure model implemented to control the extrusion rate. FIGS. 2b illustrates a light seam, while FIG. 2c illustrates a heavy seam. An extrusion profile 50 shown in FIG. 2b includes a first tool path portion 52 and a last tool path portion 54 joined together by a light, or thin, seam 56. Light seam 56 is caused by a smaller bead width at the start and stop points of the tool path than that occurring elsewhere. An extrusion profile 60 shown in FIG. 2c includes a start tool path portion 62 and a stop tool path portion 64 joined together by a heavy, or fat, seam 66. Heavy seam 66 is caused by too much material being extruded at the start and/or stop points of the tool path.

The present invention recognizes that melt expansion of the modeling material is a significant cause of errors in the desired extrusion profile, such as the seam errors illustrated in FIGS. 2b and 2c. Utilizing the present invention, the melt flow component of the extruded flow rate is predicted and is compensated for by adjusting the input rate of solid material, resulting in significantly reduced errors in bead width and seams.

Figure 3:
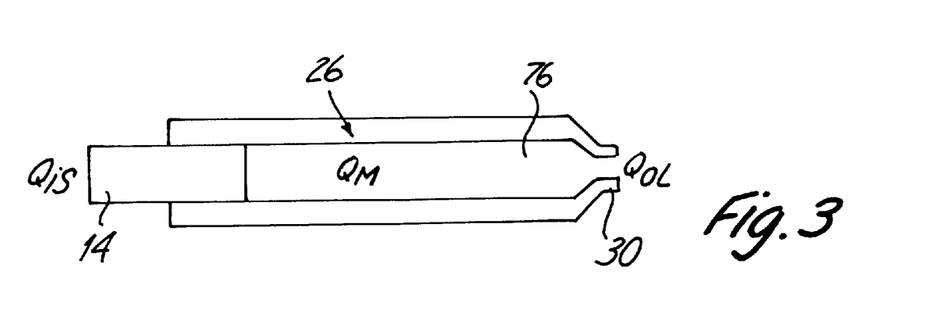
FIG. 3 is a graphical representation of a liquifier operating at a minimum flow rate.
Figure 4:
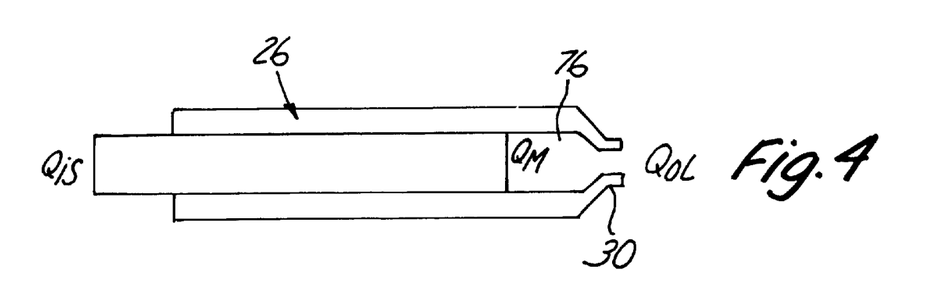
FIG. 4 is a graphical representation of a liquifier operating at a maximum flow rate.

The melt flow compensation of the present invention takes into account the flow history of the liquifier to command a flow rate that will account for melt flow. FIG. 3 is a graphical representation of a cross-section of the liquifier 26 operating at a minimum flow rate. FIG. 4 is a graphical representation of a cross-section of liquifier 26 operating at a maximum flow rate. The filament 14 is fed into the liquifier 26 at an input (or commanded) flow rate $Q_{iS}$, heated in the liquifier 26 to a liquid 76 at a melting rate $Q_M$, and extruded out of the tip 30 of liquifier 26 at an output flow rate $Q_{oL}$. As illustrated, at higher flow rates, more of the liquifier 26 contains solid modeling material in the form of filament 14, as compared to melted modeling material (liquid 76). This is due to limited melt capacity of the liquifier. If the input flow rate, $Q_{iS}$, were to go from a higher to a lower rate, the amount of liquid 76 in the liquifier 26 will increase and the output flow rate, $Q_{oL}$, will include a melt flow component, $Q_{MFL}$, that is taken into account by the present invention by way of a downward adjustment of the commanded input flow rate, $Q_{iS}$.

In order to account for melt flow, the melt flow characteristic of a given operating system may be modeled by an equation. The melt rate of a solid rod of material in a cylindrical liquifier has been observed to be approximately exponential. For a step increase in solid material input rate, the rate of melting increases exponentially to an asymptotic value equal to the input rate of solid material. When the liquifier pump is turned on, the melt flow rate of material from the liquifier increases approximately exponentially. Conversely, when the liquifier pump is turned off, the melt flow rate exponentially decreases to zero. Accordingly, melt flow can be predicted by an exponential equation dependent upon a melt flow time constant of the liquifier.

Figure 5A:
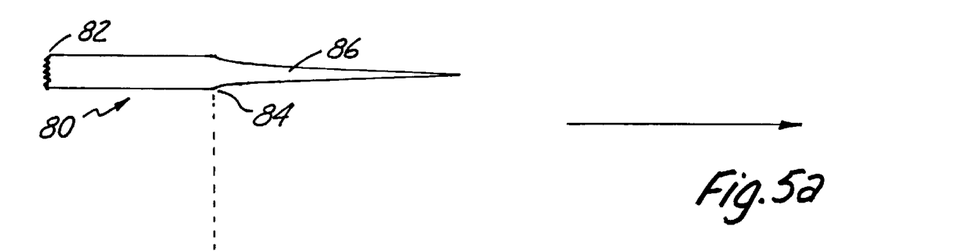
FIG. 5a is a view of an extrusion profile extruded by a prior art liquifier pump operating at a steady state and then turned off.
Figure 5B:
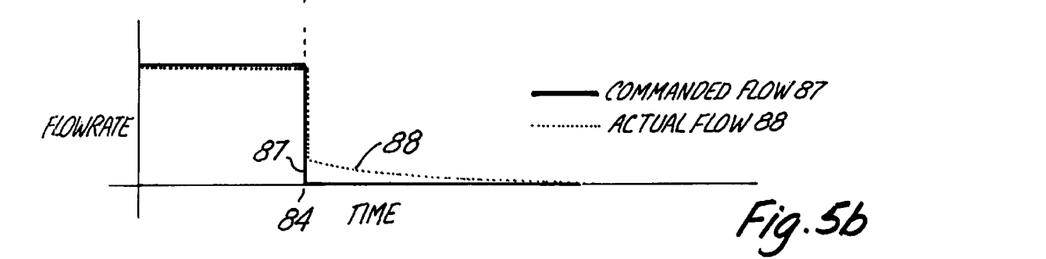

FIGS. 5a and 5b graphically illustrate flow of material when a liquifier pump according to the prior art is turned off. FIG. 5a illustrates an extrusion profile 80, while FIG. 5b is a graphical representation of the amount of flow. In extruding extrusion profile 80, the extrusion head which carries the liquifier pump is moving at a constant velocity to the right. At a first tool path point 82, a commanded flow rate 87 is at a constant rate and the liquifier pump has been on long enough to reach steady state. At a second point 84, the flow rate 87 is commanded off (with the appropriate "suck back" pressure reduction performed) while the extrusion head continues to move. Even though the pump is commanded off, the flow continues. This additional flow, which is produced by the unaccounted expansion of melted material in the liquifier, results in an excess portion 86 of extrusion profile 80. This excess portion 86 can be measured and has exponential form. If the extrusion head were to have stopped moving at point 84, the excess flow due to expansion would have created a large ball or heavy seam at that point.

In FIG. 5b, the commanded flow rate 87 is a step function representing a target flow. In the target flow, it is desired that the flow remain constant from the time the pump is turned on until the time the pump is turned off. Because of the unaccounted for expansion of material, however, the pump has an actual flow rate 88 that does not equal the commanded flow rate 87. Rather than immediately dropping to zero, the actual flow rate 88 experiences an exponential decrease to zero after point 84 when the pump is turned off.

Figure 6A:
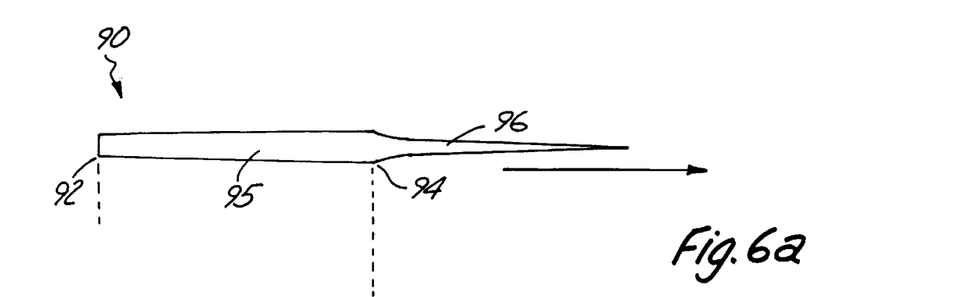
FIG. 6a is a view of an extrusion profile extruded by a prior art liquifier pump as it is turned on and then off.
Figure 6B:
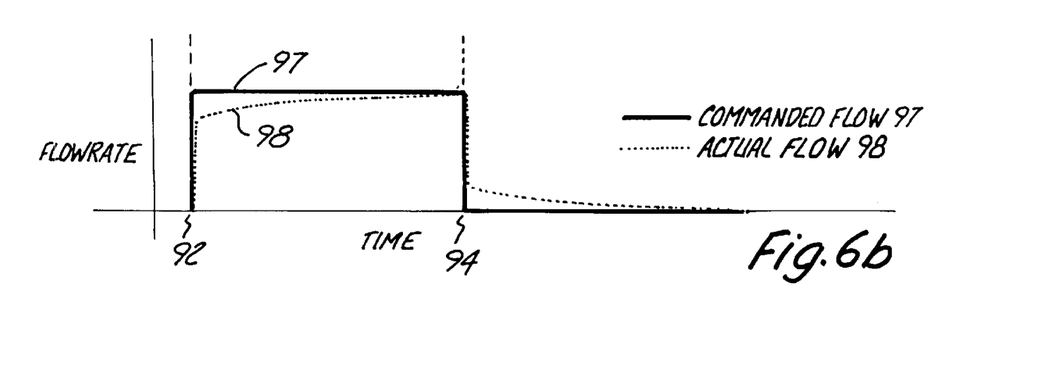

FIGS. 6a and 6b graphically illustrate flow of material when a liquifier pump according the prior art is turned on. FIG. 6a illustrates of an extrusion profile 90, while FIG. 6b is a graphical representation of the amount of flow. In the extrusion profile 90, the extrusion head is moving at a constant velocity to the right. The liquifier pump remains on until it almost reaches steady state and then it is commanded off. At a first tool path point 92, the pump is commanded on at a flow rate 97 which is constant, but not all of the commanded flow is immediately extruded. Three time constants later, at a second tool path point 94, the flow rate 97 is commanded off. Along a portion 95 of extrusion profile 90, between points 92 and 94, the extruded bead widens as actual flow rate 98 approaches the commanded flow rate 97. At point 94, the actual flow rate 98 catches up to the commanded flow rate 97. As in the example of FIGS. 5a and 5b, flow continues after the pump is turned off due to the thermal expansion of material in the liquifier. The volume of flow missing when the pump is commanded on equals the excess volume of material extruded after the pump is commanded off (mass in equals mass out).

In FIG. 6b, the commanded flow rate 97 is a step function representing a target flow rate. As described above, when the pump is turned on at point 92, the actual flow rate 98 does not initially equal the commanded flow rate 97, but rather exponentially increases to commanded flow rate 97. The time required to reach steady state, or the commanded flow rate 97, is equal to the time it takes for heat from the walls of the liquifier to be conducted to the center of the solid material. The melt flow time constant ($\tau_{MF}$) for this behavior is between 1 and 3 seconds for filaments with 0.070 nominal diameters, and the time to reach steady state is equal to about 3 to 4 time constants.

The output flow rate of liquid material, $Q_{oL}$, is affected by both the rate that material fed into the liquifier ($Q_{iS}$) and the rate that the solid filament melts ($Q_M$). The output flow rate of material due to melting (i.e., "melt flow"), can be predicted by the equation:

$$Q_{MFL} = \%_{MF} * Q_M \tag{1}$$

Where $\%_{MF}$ is the percent expansion of the modeling material during melting, and $Q_{MFL}$ is the output flow rate of liquid material due to melting. The present invention models the output flow rate of liquid material $Q_{oL}$ as the sum of the rate that the material is fed into the liquifier and the melt flow component:

$$Q_{oL} = Q_{iS} + Q_{MFL} = Q_{iS} + \%_{MF} * Q_M \tag{2}$$

At any given time, the output rate of liquid material $Q_{oL}$ may be written as a function of the output rate of solid material $Q_{oS}$ according to the equation:

$$Q_{oL} = Q_{oS}(1 + \%_{MF}), \tag{3}$$

and the output rate of solid material $Q_{oS}$ may thus be written as:

$$Q_{oS} = \frac{Q_{oL}}{1 + \%_{MF}} = \frac{Q_{iS} + \%_{MF} * Q_M}{1 + \%_{MF}}. \tag{4}$$

Equation (4) can be reduced as follows:

$$Q_{oS} = \frac{Q_{iS}}{1 + \%_{MF}} + \frac{\%_{MF} * Q_M}{1 + \%_{MF}}. \tag{5}$$

At steady state conditions $Q_M = Q_{iS}$, and equation (5) reduces to:

$$Q_{oS} = Q_{iS} \tag{6}$$

At non-steady state conditions, equation (5) can also be simplified by recognizing that the rate of solid material extrusion due to melting can be predicted by the equation:

$$Q_{MFS} = \frac{\%_{MF} * Q_M}{1 + \%_{MF}} \tag{7}$$

so that the output rate of solid material $Q_{oS}$ is given by:

$$Q_{oS} = \frac{Q_{iS}}{1 + \%_{MF}} + Q_{MFS} \tag{8}$$

The present invention compensates for the melt flow caused by material expansion in setting the commanded input rate, so that the output flow rate will approximately match a target flow rate. In the previous examples, a step input was assumed and the liquifier pump was on for at least three time constants so that near steady state conditions were achieved. Any melt flow as a function of time, however, can be compensated for using the present invention.

The melt flow can be represented as a function of time, in any number of ways that may be suitable for a given operating system. A suitable expression for the filament pump liquifier of the exemplary embodiment is the exponential expression:

$$Q_{MFS} = \frac{\%_{MF} * Q_{iS}}{1 + \%_{MF}} * \left(1 - e^{\frac{-t}{\tau_{MF}}}\right) \tag{9}$$

where $\tau_{MF}$ is the time constant that defines the exponential increase in flow rate due to melting, and $Q_{MFS}$ is the rate of solid material extrusion due to melt expansion (i.e., the flow rate of material due to expansion that has been re-solidified after extrusion). Taking the derivative of equation (9), the difference equation $\Delta Q_{MFS}$ is represented as:

$$\Delta Q_{MFS} = \left(\frac{\%_{MF} * Q_{iS}}{1 + \%_{MF}} - Q_{MFS}\right) * \frac{\Delta t}{\tau_{MF}} \tag{10}$$

Equation (10) is then used to calculate the change in melt flow from one step in time to the next. This calculation is valid for any given flow history, and is valid regardless of the form of the input flow.

Figure 7A:
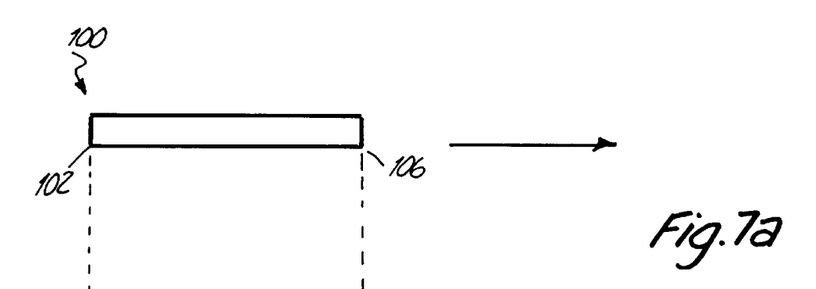
FIG. 7a is a view of an extrusion profile extruded by a liquifier pump in accordance with the present invention as it is turned on and then off.
Figure 7B:
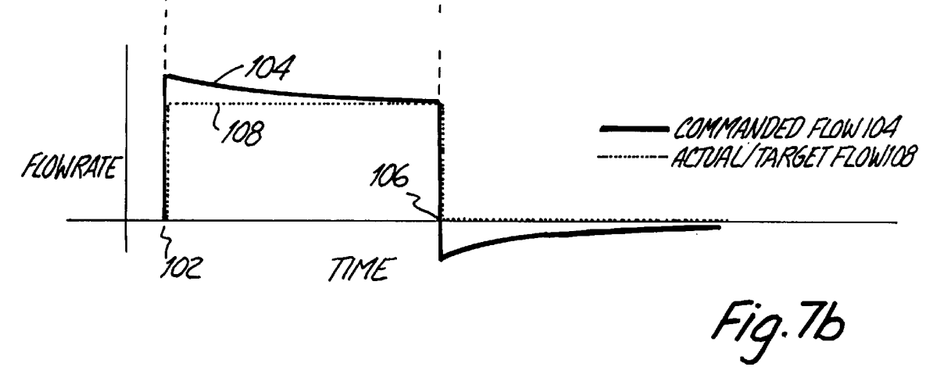

FIGS. 7a and 7b graphically illustrate a flow of material produced by a liquifier pump, in which melt flow is taken into account according to the present invention. FIG. 7a illustrates an extrusion profile 100 extruded by a liquifier pump in accordance with the present invention, while FIG. 7b is a graphical representation of the amount of flow produced by the liquifier pump.

In extruding extrusion profile 100, the extrusion head moves at a constant velocity to the right. At a first point 102, the pump is turned on, with a commanded flow rate 104 set at a rate higher than the target flow rate. The commanded flow rate 104 is then exponentially decayed to the target rate. At a second point 106, the commanded flow rate 104 first reverses direction and then exponentially decays up to the target flow of zero. In this way, the extrusion profile 100 has a constant bead width, and an actual flow rate 108 equals the target flow rate. Importantly, the amount of excess flow when the pump is turned on equals the shortage in flow when the pump is turned off.

Method

The first step in compensating for melt flow rate is to determine the target output flow rate at each time step. The target rate is the desired output flow rate of either liquid material or re-solidified material, selected so as to achieve (approximately) the desired extrusion profile. For convenience of discussion herein, the target rate is viewed as the desired output flow rate of re-solidified material. This target flow rate, along with the constants representing thermal properties of the operating system (the melt flow time constant, $\tau_{MF}$, and the percent melt expansion, $\%_{MF}$), are then used to calculate the commanded input flow rate at each time step. To calculate a commanded input flow rate, the melt flow component of the output flow rate from one time step to another is predicted. The melt flow rate may be predicted by calculating the change in rate of solid material extrusion due to melt expansion, $\Delta Q_{MFS}$, for each time step. When the liquifier first becomes active after not having extruded for at least four melt flow time constants, the initial melt flow rate $\Delta Q_{MFS}$ is assumed to be zero. The change in melt flow rate $\Delta Q_{MFS}$ is added to the previous value of melt flow rate to calculate a new value of melt flow rate. This new melt flow rate is then subtracted from the target flow rate in the system controller to produce the desired extrusion profile. This calculation is repeated for every time step until the liquifier becomes inactive.

Implementation

An implementation of the present invention can be performed by identifying for a given operating system the percent expansion due to melt flow, $\%_{MF}$, and the melt flow time constant, $\tau_{MF}$; defining equations for several variables: $\Delta Q_{MFS}$, temporary variable $Q_{MFS,t}$ representing the melt flow component of solid material extrusion at a time t, and the commanded output variable, $Q_{iS}$; providing two input variables, the time step, $\Delta t$, and the target flow rate, $Q_{Target}$, which is a function of time; and providing an initial value for $Q_{MFS,t-1}$.

An algorithm for implementing the present invention in an operating system using a liquifier pump as described in the exemplary embodiment herein is as follows:

At $t=0$, $Q_{MFS,t}=Q_{MFS,t-1}=\Delta Q_{MFS}=0$

At time t, the melt flow component of the rate of solid material extrusion is given by:

$$Q_{MFS,t}=Q_{MFS,t-1}+\Delta Q_{MFS} \tag{11}$$

The input flow rate of solid material that is to be commanded so as to approximate the target flow rate at the time step from t–1 to t may then be calculated using equation (8) derived above for $Q_{iS}$:

$$Q_{iS}=(1+\%_{MF})*(Q_{Target}-Q_{MFS,t}) \tag{12}$$

The system controller commands the material advance mechanism to provide material to the liquifier at the calculated input flow rate, to achieve the target flow rate for the time step. The change in melt flow rate from that time step to the next is given by application of equation (10) derived above:

$$\Delta Q_{MFS} = \left(\frac{\%_{MF} * Q_{iS}}{1 + \%_{MF}} - Q_{MFS,t}\right) * \frac{\Delta t}{\tau_{MF}} \tag{13}$$

The calculated change in melt flow rate is then used in equation (11) and the algorithm is repeated for each time step.

It should be understood that the percent expansion, $\%_{MF}$, and the melt flow time constant, $\tau_{MFS}$, are unique to a given operating system. These properties can be calculated or they can be empirically measured for a given modeling material at the operating temperature of a particular operating system. In the exemplary embodiment illustrated in FIG. 1, the melt flow time constant for the system may be estimated from a model of radial heat conduction in a long cylinder. In this case, the filament is a long cylinder suddenly exposed to an increase in outer wall temperature by being forced into a hot liquefier. Chart solutions for this classical heat transfer situation are presented in many different heat transfer texts, for instance "Temperature Charts for Induction and Constant Temperature Heating", Heisler, M. P., Trans. ASME, 69, (1947). The chart line representing the constant wall temperature boundary condition may be expressed as being proportional to $\exp[-(5.31*\alpha*t)/(r_o^2)]$, where $\alpha$ is the thermal diffusivity of the modeling material and $r_o$ is the filament radius. The melt flow time constant in this situation is given by the equation:

$$\tau_{MF} = (r_o^2)/(5.31*\alpha)$$

where $\alpha$=material thermal diffusivity=$k/(\rho*c_p)$, with k being thermal conductivity, $\rho$ being density, and $c_p$ being specific heat.

In the case of an ABS filament used in Stratasys® three-dimensional modeling machines:

$r_o$=0.035 inch $c_p$=0.45 BTU/(lbm-F) (average value, 25° C. to 250° C.)

$\rho$=0.0376 lbm/in$^3$ k=2.28 E-6 BTU/(sec-in-F)

Thus, $\alpha$=2.28E-6/(0.0376*0.45)=135 E-6 (in$^2$/sec), and $\tau_{MF}$=(0.035)$^2$/(5.31*135E-6)=1.7 sec. The specific volume for a polystyrene material (which is representative of ABS) changes from 0.96 cm$^3$/gm at 30° C. to 1.06 cm$^3$/gm at 250° C. ("PVT Data for polymers"; Zoller and Walsh, Technomic Publishing, 1995, page 133). This is an increase of 10%; thus %$_{MF}$=0.10 for this material.

The values for the melt flow time constant and percent expansion obtained theoretically are estimates of the actual system values, made based upon engineering assumptions. These constants can be modified by physical observations of real errors in extrusion profiles given by a physical operating system to obtain values that more accurately characterize the real system responses. On a Stratasys® FDM® three-dimensional modeling machine, the melt flow time constant for the ABS thermoplastic was empirically measured as 2.0 seconds, and the melt flow expansion was measured as 8 percent. On this machine using the empirically derived constants, the worst case errors in extrusion profile were reduced by 80–90 percent.

GLOSSARY

The following table defines some of the variables used throughout this application:

| Symbol | Definition |
| --- | --- |
| $Q_{iS}$ | Commanded liquifier input rate of solid material. |
| $Q_{oS}$ | Output rate of material after it has re-solidified. |
| $Q_M$ | Rate of melting of solid material in the liquifier. |
| $Q_{MFL}$ | Output flow rate of liquid material due to melt expansion. |
| $Q_{oL}$ | Output flow rate of liquid material. |
| $Q_{MFS}$ | Output rate of solid material extrusion due to melt expansion. |
| $Q_{Target}$ | Liquifier target output flow rate. |
| %$_{MF}$ | Percent expansion of modeling material due to temperature change, in decimal form. |
| $\tau_{MF}$ | Melt flow time constant of liquifier. |

Although the present invention has been described with reference to preferred embodiments, workers skilled in the art will recognize that changes may be made in form and detail without departing from the spirit and scope of the invention. For example, the present description focuses on three-dimensional modeling applications, but it should be understood that the melt flow compensation of the present invention is applicable in other types of extrusion systems that seek to achieve a predetermined extrusion profile. Other fields in which the present invention can be applied include adhesive dispensing applications (e.g., assembly of cars, diapers, boxes and clothing) and solder paste extrusion (used, for example, in fabrication of circuit boards). Further, in the exemplary operating system described herein, the melt flow rate has a response that approximates an exponential function dependent upon the melt flow time constant of the liquifier. Accordingly, in the preferred embodiment of the invention, the commanded pump flow rate is determined according to the estimated exponential profile of melt flow. The exponential function has the advantage of simplicity while providing sufficient accuracy for most applications. The flow rate profile for a given operating system may, however, be fitted to other types of time-responsive functions, for example, a polynomial function or higher-order equations, which are more complex but may provide greater accuracy. The melt flow compensation of the present invention can be implemented using look-up tables, particularly where a more complex model of melt flow is used.

What is claimed is:

1. In an extrusion apparatus having a liquifier which receives a solid element of a material that exhibits thermal expansion, heats the material, and deposits a flow of the material through a dispensing tip thereof along a predetermined tool path at an output rate, said apparatus using a material advance mechanism to supply the solid element of material to the liquifier at an input rate which controls the output rate, a method for matching the output rate to a predetermined target output rate which is selected to achieve a desired extrusion profile of the material deposited along the tool path, comprising the steps of:

predicting a melt flow component ($Q_{MF}$) of the output rate for a time step corresponding to a segment of the tool path, the melt flow being a rate of flow attributed to thermal expansion of the material heated in the liquifier; and     commanding the input rate ($Q_{iS}$) for that time step so as to compensate for the predicted melt flow.

2. The method of claim 1, and further comprising the step of:

repeating the steps of predicting and commanding for subsequent time steps.

3. The method of claim 1, wherein the melt flow is predicted as a function of a melt flow time constant of the liquifier ($\tau_{MF}$) and a percent thermal expansion of the material (%$_{MF}$).

4. The method of claim 3, wherein predicting the melt flow component ($Q_{MF}$) of the output rate at the time step comprises adding the melt flow component from a previous time step ($Q_{MF\ t-1}$) to a predicted change in the melt flow component from the previous time step ($\Delta Q_{MF}$), and wherein the input rate ($Q_{iS}$) for the time step is commanded according to the equation $Q_{iS}=(1+\%_{MF})(Q_{Target}-Q_{MF})$ where $Q_{target}$ is the predetermined target output rate.

5. The method of claim 4, wherein the predicted change in the melt flow component is given by the difference equation $$\Delta Q_{MFS} = \frac{\%_{MF} * Q_{iS_{t-1}}}{1+\%_{MF}} - Q_{MFS_{t-1}} * \frac{\Delta t}{\tau_{MF}},$$

where $Q_{iS\ t-1}$ is the input rate from the previous step, and $\Delta t$ is the duration of a time step.

6. The method of claim 1, wherein the melt flow over time is predicted using an exponential model.

7. The method of claim 6, wherein the exponential model is a function of a melt flow time constant of the liquifier ($\tau_{MF}$) and a percent thermal expansion of the material ($\%_{MF}$).

8. The method of claim 7, wherein the exponential model of melt flow over time is given by the equation $$Q_{MFS} = \frac{\%_{MF} * Q_{iS}}{1+\%_{MF}} * \left(1 - e^{\frac{-t}{\tau_{MF}}}\right),$$

for a step change in $Q_{iS}$ from zero.

9. An extrusion apparatus comprising:
a liquifier which receives a solid element of a material that exhibits thermal expansion, heats the material, and deposits a flow of the material through a dispensing tip thereof along a predetermined tool path at an output rate;
a material advance mechanism which supplies the solid element of material to the liquifier at an input rate ($Q_{iS}$) that controls the output rate;
a control for providing control signals to the material advance mechanism, the control signals commanding operation of the material advance mechanism so that the input rate compensates for a predicted melt flow component ($Q_{MF}$) of the output rate.

10. The extrusion apparatus of claim 9, wherein the control contains an algorithm for predicting the melt flow component as a function of a melt flow time constant of the liquifier ($\tau_{MF}$) and a percent thermal expansion of the material ($\%_{MF}$).

11. The extrusion apparatus of claim 10, wherein the algorithm comprises calculating a predicted change in the melt flow component ($Q_{MF}$) from a previous time step to a next time step according to the difference equation $$\Delta Q_{MFS} = \frac{\%_{MF} * Q_{iS_{t-1}}}{1+\%_{MF}} - Q_{MFS_{t-1}} * \frac{\Delta t}{\tau_{MF}},$$

where $Q_{iS\ t-1}$ is the input rate at the previous time step, $Q_{MFS\ t-1}$ is the melt flow component of the output rate of solid material at the previous time step, and $\Delta t$ is the duration of a time step.

12. The extrusion apparatus of claim 9, where melt flow over time is predicted using an exponential model.

13. The extrusion apparatus of claim 12, wherein the exponential model of melt flow over time is given by the equation $$Q_{MFS} = \frac{\%_{MF} * Q_{iS}}{1+\%_{MF}} * \left(1 - e^{\frac{-t}{\tau_{MF}}}\right).$$

* * * * *

UNITED STATES PATENT AND TRADEMARK OFFICE
CERTIFICATE OF CORRECTION

PATENT NO. : 6,547,995 B1
DATED : April 15, 2003
INVENTOR(S) : James W. Comb

It is certified that error appears in the above-identified patent and that said Letters Patent is hereby corrected as shown below:

Column 12,
After the equation, insert -- , for a step change in $Q_{iS}$ from zero --

Signed and Sealed this

Tenth Day of February, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,547,995 B1
DATED : April 15, 2003
INVENTOR(S) : James W. Comb

It is certified that error appears in the above-identified patent and that said Letters Patent is hereby corrected as shown below:

Column 10,
Line 53, delete "$(Q_{MF})$", insert -- $(Q_{MFS})$ --.

Column 11,
Line 2, delete "$(Q_{MF})$", insert -- $(Q_{MFS})$ --.
Line 4, delete "$(Q_{MF\ t-1})$", insert -- $(Q_{MFS\ t-1})$ --.
Line 5, delete "$(\Delta Q_{MF})$", insert -- $(\Delta Q_{MFS})$ --.
Line 7, delete "$Q_{iS}=(1+\%_{MF})(Q_{Target}-Q_{MF})$", insert -- $Q_{iS}=(1+\%_{MF})(Q_{Target}-Q_{MFS})$ --.
Line 8, delete "$Q_{target}$", insert -- $Q_{Target}$ --.

Column 12,
Lines 5 and 13, delete "$(Q_{MF})$", insert -- $(Q_{MFS})$ --.

Signed and Sealed this

Third Day of January, 2006

JON W. DUDAS
*Director of the United States Patent and Trademark Office*